United States Patent [19]

Ammannati et al.

[11] 4,141,713
[45] Feb. 27, 1979

[54] APPARATUS FOR EXTRACTING A GLASS RIBBON FROM THE EGRESS OF A FLOTATION FURNACE

[75] Inventors: Piero Ammannati, Pisa, Italy; Jean-Claude Coulon, Chalon sur Saone, France

[73] Assignee: Saint Gobain Industries, Neuilly-sur-Seine, France

[21] Appl. No.: 789,270

[22] Filed: Apr. 20, 1977

[30] Foreign Application Priority Data

Apr. 23, 1976 [FR] France ............................... 76 12006
Jan. 19, 1977 [FR] France ............................... 77 01385

[51] Int. Cl.² ........................................... C03B 18/02
[52] U.S. Cl. ................................. 65/182 R; 65/99 A
[58] Field of Search ............... 65/65 A, 99 A, 182 R

[56] References Cited

U.S. PATENT DOCUMENTS

| | | | |
|---|---|---|---|
| 2,911,759 | 11/1959 | Pilkington et al. | 65/65 A |
| 3,433,614 | 3/1969 | Dickinson et al. | 65/65 A X |
| 3,607,202 | 9/1971 | Swillinger | 65/182 R |
| 4,022,601 | 5/1977 | Sopko | 65/99 A |
| 4,057,410 | 11/1977 | Daman et al. | 65/182 R |

*Primary Examiner*—Arthur D. Kellogg
*Attorney, Agent, or Firm*—Pennie & Edmonds

[57] ABSTRACT

There is disclosed a flotation furnace for manufacturing glass ribbon and an apparatus for extracting the glass ribbon from the furnace. The apparatus includes a case with extraction rollers positioned therein. The case has an opening for receiving the glass ribbon from the furnace, an opening for exiting the glass ribbon from the case, and an opening for discharging combustion gases. The case may include a carriage which moves transverse to the flow of the glass ribbon.

19 Claims, 4 Drawing Figures

APPARATUS FOR EXTRACTING A GLASS RIBBON FROM THE EGRESS OF A FLOTATION FURNACE

BACKGROUND OF THE INVENTION

1. Field of the Invention

This invention relates to the extraction of glass ribbon from a flotation furnace.

2. Description Of The Prior Art

The manufacture of glass ribbon by casting glass on a molten metal bath contained in a flotation furnace is well known. In the known process, molten glass is poured onto a bath of molten metal to form a flat ribbon of glass. The metal bath is shielded by a protective reducing atmosphere composed of hydrogen and nitrogen. The protective atmosphere is retained within a leak-proof enclosure at slightly greater than atmospheric pressure. The glass ribbon is drawn from the flotation furnace by special extraction rollers whose height may be accurately positioned with respect to the level of the metal bath. These rollers also convey the glass ribbon to a flattening fixture for further treatment.

To ensure that the metal bath is protected by the reducing atmosphere, losses of the protective atmosphere as well as inflows of ambient air to the flotation furnace must be minimized. These losses and unwanted inflows are acute at either end of the metal bath. To maximize retention of the protective reducing atmosphere, the prior art devices have their extraction rollers located in a lock-chamber of appreciable length which contains the same protective atmosphere as above the metal bath. The upper portion of the lock-chamber is barred by a succession of leakproof curtains arranged transversely above the extraction rollers. The lower portion of the lock-chamber is barred by leak-proof joints positioned underneath the lower generatrix of the rollers. The curtains and joints form a leak-proof barrier which prevents the ambient atmosphere from contaminating the protective atmosphere. Thus, the leak-proof barrier protects the metal bath from oxidation. Lock-chambers of this type have several drawbacks. Access to various members such as the extraction rollers is difficult, making maintenance and replacement of the rollers arduous. Furthermore, the appreciable length of these lock-chambers results in excessive heat loss from the glass ribbon as it passes through the lock-chamber. Consequently, the temperature of the glass ribbon exiting the lock-chamber is often too low to permit further processing of the glass such as treating it with metal oxide deposits.

Other prior art devices have the extraction rollers positioned downstream of the lock-chamber and exposed to the ambivient air. Access to the rollers is facilitated by this arrangement but a substantial temperature gradient between the furnace exit and the flattening fixture entrance occurs. This gradient may alter the quality of the manufactured glass ribbon.

We have invented an apparatus for extracting glass ribbon from the egress of a flotation furnace which provides easy access to the extraction rollers, retains the glass ribbon exiting the furnace at a temperature sufficiently high to permit further processing and maintains a uniform thermal transition of the glass ribbon passing from the furnace exit to the flattening fixture entrance.

SUMMARY OF THE INVENTION

This invention provides an improved apparatus for extracting a glass ribbon from the egress of a flotation furnace. The apparatus comprises a plurality of extraction rollers arranged in succession adjacent the egress of the flotation furnace for extracting the glass ribbon from the furnace and transporting it away from the furnace. The extracting apparatus further comprises enclosure means arranged adjacent the egress of the flotation furnace for enclosing the rollers. The enclosure means has an opening for receiving the glass ribbon, an opening for exiting the glass ribbon, and an opening located above the rollers and adjacent the egress of the flotation furnace which allows the combustion gases to exhaust to the ambient atmosphere. The enclosure means at least partially regulates the temperature of the glass ribbon passing therethrough.

In an embodiment of the present invention, the enclosure means comprises a case having a U-shaped cradle and an inverted U-shaped roof positioned above the cradle. The U-shaped cradle includes side walls which are parallel to the axis of the glass ribbon. The upper edges of the side walls terminate at a level at least equal to that of the upper generatrix of the extraction rollers. The extraction rollers are rotatably mounted in succession within the cradle with their rotational axes transverse to the direction of the glass ribbon flow. The cradle at least partially supports the rollers.

The U-shaped roof has side walls which are parallel to the axis of the glass ribbon. The side walls of the roof rest upon the side walls of the cradle. Advantageously, the end of the roof nearer the flotation furnace is positioned downstream from the extraction roller nearest the flotation furnace so as to define the combustion gas vent opening generally between the egress of the flotation furnace and this end of the roof. Alternatively, the case is of a unitary construction with its upper portion near the flotation furnace removed to define the combustion gas vent opening.

The upstream and downstream ends of the roof may be sealed by sealing means such as gas-proof curtains. These curtains assist in preventing an abrupt thermal transition and in maintaining a uniform thermal gradient for the glass ribbon passing through the case.

In one embodiment, the cradle has at least one of its upstream and downstream ends closed by a transverse plate or wall. The upper edge of the wall (or walls) terminates at a level below that of the upper generatrix of the extraction rollers to permit the glass ribbon to pass thereabove.

The cradle may be a carriage having means to move the carriage transversely to the flow of the glass ribbon. For example, rollers may be secured to the underneath portion of the carriage and movably mounted on guide rails which are positioned transverse to the direction of the glass ribbon flow. The mobility of the cradle provides easy access to the extraction rollers for their maintenance and the like.

The extraction rollers may be located and positioned within the cradle of the casing so as to form a gap at the egress of the flotation furnace below the glass ribbon. Gases pass from the flotation furnace, through the gap and ignite. The resulting combustion gases pass at least underneath the extraction roller adjacent the flotation furnace, surround the glass ribbon and exit through the combustion gas vent opening in the case. A thermal barrier is thereby created between the flotation furnace and the case which aids in the thermal regulation of the glass ribbon. This produces an environment that heats the upper and lower surfaces of the glass ribbon passing through the case to a uniformly high temperature.

In a preferred embodiment, the apparatus of the present invention includes a means for regulating the temperature of the egress of the flotation furnace comprising a cooling grid secured to the flotation furnace egress below the glass ribbon. The cooling grid may include a plurality of pipes such as cold pipes independently supplied with a cooling fluid for cooling the flotation furnace egress below the glass ribbon. As will be explained below, it is desirable to cool this portion of the flotation furnace to protect it from attack by tin which is contained in the molten metal bath of the flotation furnace.

Since it is undesirable to abnormally cool the extraction roller adjacent the flotation furnace, a thermal screen may be positioned between the cooling grid and this extraction roller.

The opening in the egress of the flotation furnace may be provided with sealing means such as a succession of leakproof curtains positioned above the glass ribbon. This minimizes the escape of the protective reducing atmosphere present over the metal bath of the flotation furnace. It is preferable to provide three curtains with their lower edges terminating immediately above the glass ribbon.

A more complete understanding of the invention can be obtained by reference to FIGS. 1 through 4 in conjunction with the following discussion.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
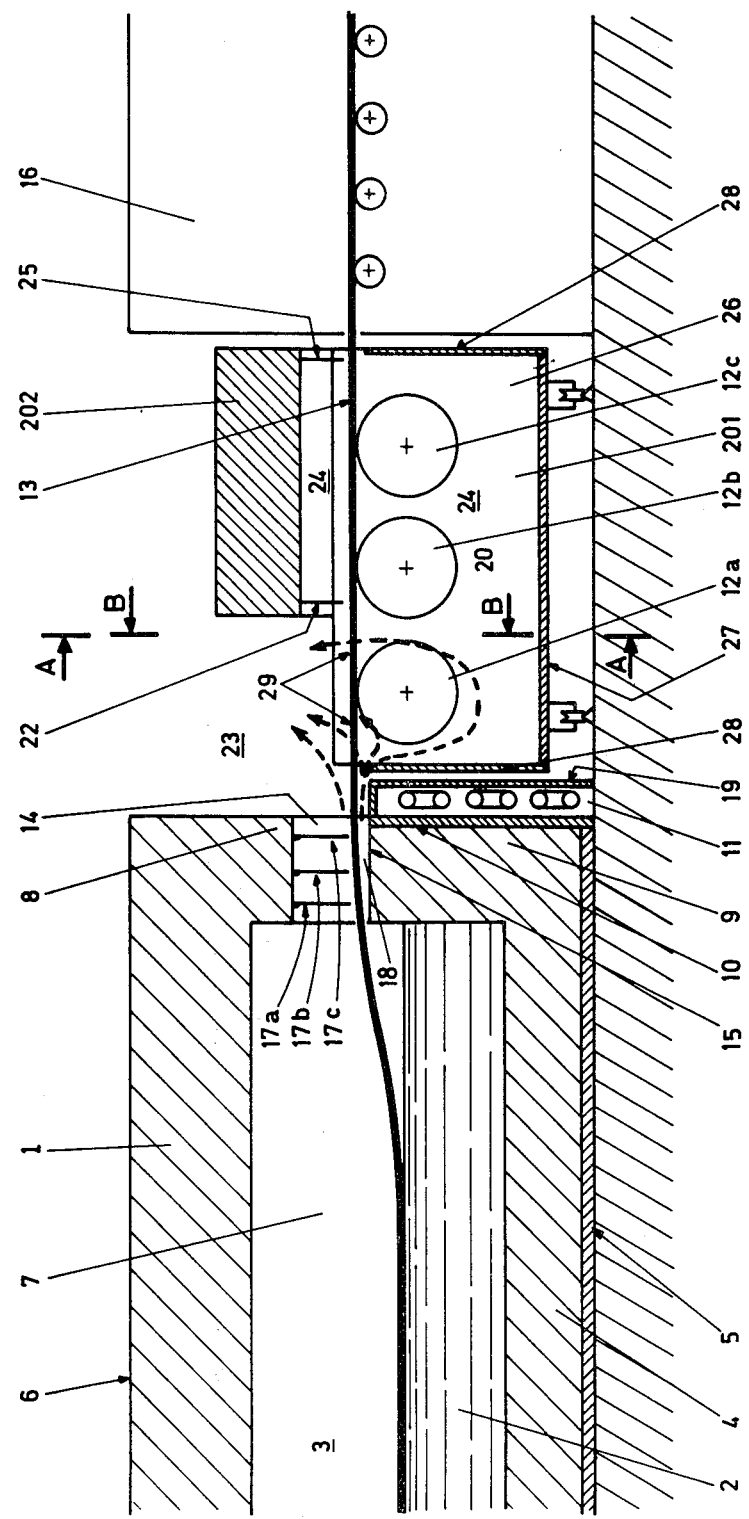
FIG. 1 is a side elevation in section of the glass ribbon extraction apparatus according to the present invention.

FIG. 1 illustrates the downstream end of a flotation furnace. A tank comprised of fire-resistant materials 4 is positioned within the flotation furnace 1. The exterior of the tank is protected by a sheet-metal lining 5. The tank is filled with a molten metal bath 2 which usually consists of molten tin. The flotation furnace 1 also includes a roof 6, side walls 7 and an exit wall 8. An opening 14 is provided in exit wall 8 for the passage of a glass ribbon 13. A metal plate 10 lines the lower portion 9 of the exit wall 8 and supports a cooling grid 11. A protective reducing atmosphere, consisting of a mixture of hydrogen and nitrogen, is maintained in the space 3 above the bath 2. A succession of gas-tight curtains 17a, 17b and 17c bars the exit opening 14 above the glass ribbon flow. Advantageously there are three curtains to prevent efficaciously the ambient atmosphere from contaminating the protective atmosphere.

An enclosure in the form of a case 20 is positioned between the downstream exit wall 8 of the flotation furnace and the inlet to a flattening fixture 16. Three adjustable extraction rollers 12a, 12b and 12c are positioned in case 20 with their axis of rotation transverse to the flow of the glass ribbon 13. The case 20 at least partially supports the rollers 12a, 12b and 12c. Glass ribbon 13 generally divides case 20 into two portions with a U-shaped cradle 201 having side walls 26 comprising the lower portion of the case 20 and a similarly U-shaped roof 202 comprising the upper portion of the case 20. The upstream portion of roof 202 is removed to form a chimney 23. Alternatively, the case 20 maybe of a unitary construction with its upstream upper portion removed to form chimney 23.

The lower portion of the case 20 has its upstream and downstream ends (facing the exit of the furnace and facing the flattening fixture 16) sealed by transverse walls 28. The upper edge of each wall 28 reaches a level below that of the upper generatrix of the extraction rollers to permit the glass ribbon 13 to pass thereabove. Alternatively, one or both of the walls 28 may be removed.

The roof 202 rests above the downstream portion of the cradle 201 and encloses the last extraction rollers 12b and 12c. The first at least extraction roller 12a is not covered by roof 202. It is topped by chimney 23 which is positioned between the exit wall 8 of the flotation furnace and the upstream end of roof 202. The superposition of roof 202 upon cradle 201 forms a thermal enclosure 24. Transverse gas-tight curtains 22 and 25 are advantageously positioned at the entrance and exit of the roof 202 above the glass ribbon 13. This insulates the atmosphere within the thermal enclosure 24.

As shown in FIG. 1, cradle 201 is a carriage 27 mounted on rails to move transversely to the flow of the glass ribbon. The roof 202 is maintained in a working position by auxiliary means not shown in FIG. 1. The mobility of the cradle 201 provides easy access to the extension rollers 12a, 12b and 12c. This accessibility can alternatively be obtained by constructing the roof 202 so that it moves in a direction parallel to the flow of the glass ribbon 13.

The arrangement of the components described above, produces vertical channels 29 located between each of the two side walls 26 of cradle 201 and glass ribbon 13. These vertical channels 29 are readily seen in FIGS. 2 and 3.

The cooling grid 11 advantageously comprises several tubes independently supplied with cooling fluid. Due to its position between plate 10 of flotation furnace exit wall 8 and the first extraction roller 12a, the cooling grid 11 might abnormally cool the roller 12a. For this reason, a thermal screen or baffle plate 19 is positioned between the cooling grid 11 and the first extraction roller 12a. The thermal screen 19 may be an insulating plate, or more advantageously, a mask which additionally covers the upper portion of the cooling grid 11.

Figure 2:
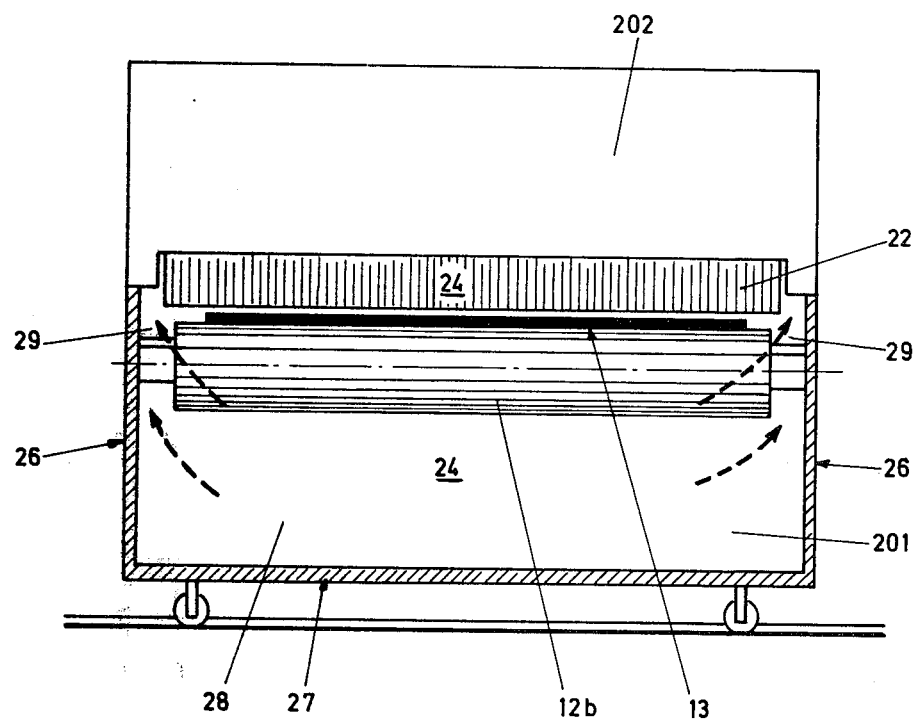
FIG. 2 is a sectional view taken along line A—A of FIG. 1.

FIG. 2 illustrates the upstream face of the roof 202 positioned above the cradle 201. Channels 29 are indicated between glass ribbon 13 and side walls 26 of the cradle 201. For clarity, the flattening fixture 16 is not shown.

Figure 3:
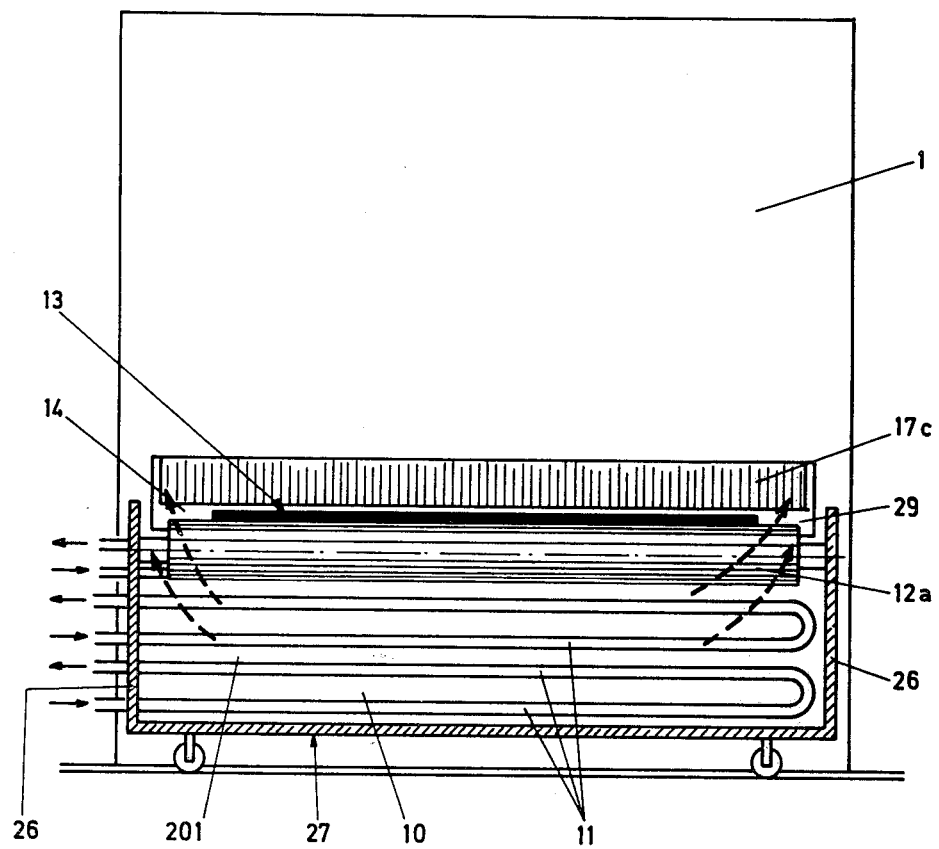
FIG. 3 is a sectional view taken along line B—B of FIG. 1.

FIG. 3 is an upstream view of the flotation furnace 1 and the glass ribbon extraction apparatus. The last gas-tight curtain 17c seals opening 14 with the curtain stopping advantageously near yet not contacting the glass ribbon 13. The cooling grid 11, shown behind the first extraction roller 12a, comprises an assembly of cold pins indepently supplied with cooling fluid. The configuration of the pins permits the inflow and outflow of fluid to occur on the same side of the cooling grid 11. The cooling fluid may be for example air, oil or water.

For clarity, the thermal screen 19 and the wall 28 of cradle 201 have not been shown.

Figure 4:
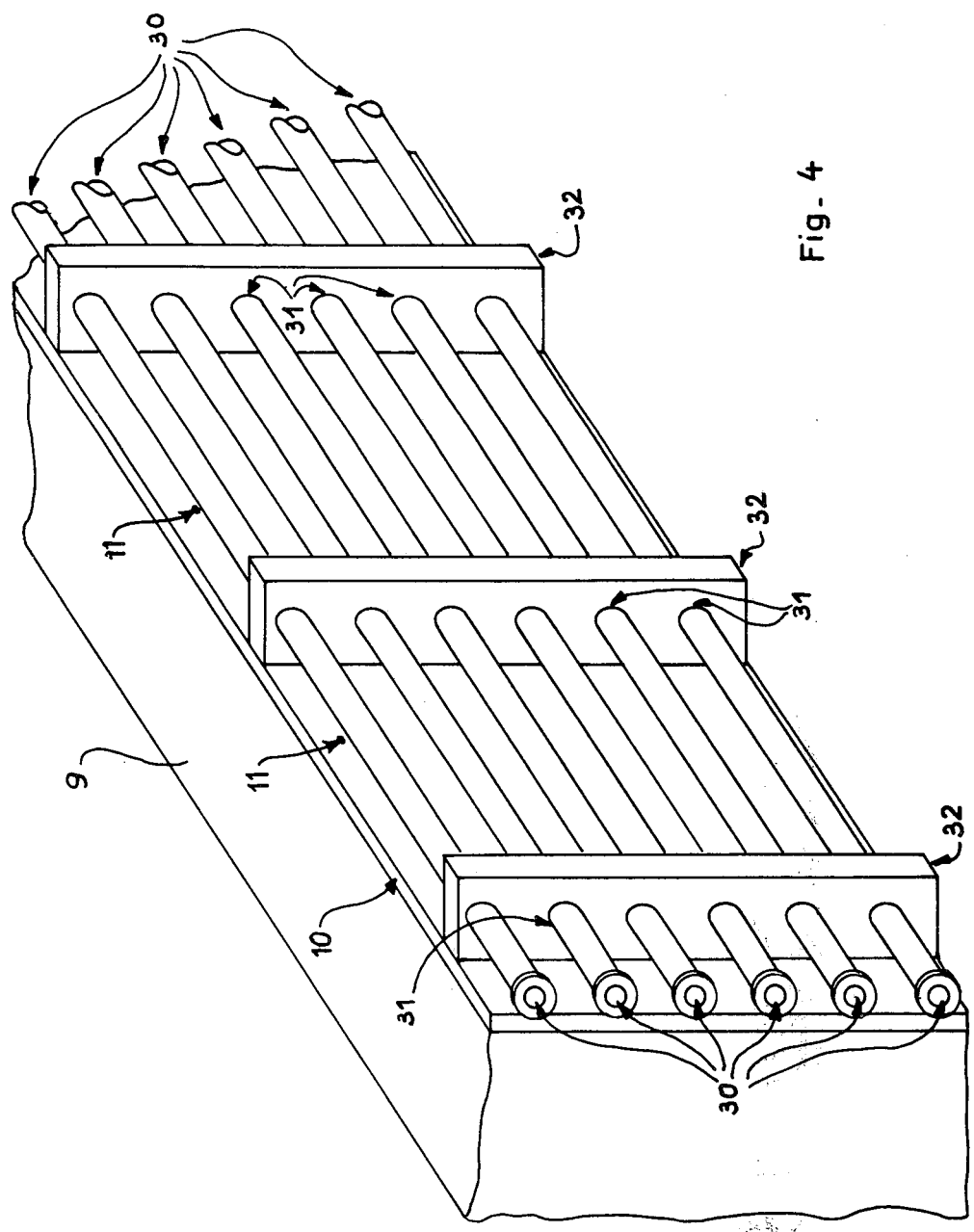
FIG. 4 is a perspective view of an alternate embodiment of the cooling grid of FIG. 1.

FIG. 4 illustrates the downstream end of the tank of the flotation furnace 1 including the metal bath 2, lower exit wall 9, metal plate 10 and cooling grid 11. This grid 11 advantageously comprises a series of horizontal tubes 30 inserted in openings 31 and a series of flat iron vertical supports 32 attached onto the external face of metal plate 10 by known means such as welding.

By separately adjusting the fluid flow in each of the tubes 30, the temperature of various portions of metal plate 10 and lower exit wall 9 may advantageously be regulated. Efficient cooling of this portion of the flotation furnace 1 is desired to protect the metal plate 10 from attack by the molten tin contained in metal bath 2. The tin might have seeped between the interstices of the fire-resistant materials 4 to the metal plate 10. Excess cooling near the outlet opening 14, however, should be avoided. Substantial cooling in this area gives rise to convection currents in the metal bath 2. These currents carry tin oxides to the exit wall 8 of the flotation furnace approxiamately at the location of the glass ribbon exit from the metal bath 2. These oxides can contaminate the glass.

According to FIG. 4, the cooling fluid is supplied to each tube 30 at the same side of the cooling grid 11 and is evacuated at the other side of the grid 11. The tubes 30 may be lined with fins and can be located on two rows parallel to metal plate 10.

In the flotation furnace, the reducing atomsphere above the molten metal bath 2 consists preferably of a nitrogen-hydrogen mixture. This atomsphere is at a pressure greater than the atomspheric pressure outside the furnace causing hot gases to escape form the furnace through the exit opening 14 in two streams. A first stream forms between the upper surface of the glass ribbon 13 and the leak-proof curtains 17a, 17b and 17c. The first stream is generally small because the curtains 17a,17b and 17c advantageously terminate at a short distance above the upper surface of the glass ribbon 13. A second, generally larger stream 18 forms between the underside of the glass ribbon 13 and a lower lip 15 of the exit opening 14. The hydrogen ignites at the exit of the flotation furnace with combustion occurring above and especially below the glass ribbon 13 toward the upstream portion of cradle 201. The flames and hot gases produced by the combustion of the gases pass underneath the extraction roller 12a, through verticle channels 29, which are located between glass ribbon 13 and side walls 26 of the cradle 201, and exhaust through chimney 23 to the ambient atomsphere. A typical flow of the flames and combustion gases is indicated in FIGS. 1-3 by stippled arrows. The combustion of the gases creates a thermal barrier between the surrounding atomsphere on either side of the flotation furnace line and the glass ribbon 13. This effect, combined with the thermal regulating effect of the thermal enclosure 24, protects the high temperature glass ribbon 13 from sudden or uneven cooling with its resulting thermal stresses. Such stresses are harmful to the quality of the glass.

Thus, the present invention provides for the thermal regulation of the glass ribbon by preventing any sudden fall in its temperature. The glass ribbon passing through the extracting apparatus is also retained at a high temperature by the extracting apparatus. It is possible, therefore, to perform various processes on the high temperature glass ribbon. For example, the glass ribbon could be coated with a metal oxide deposit according to the methods described in French patent applications published under numbers 2,211,411 and 2,277,049. The metal oxide deposits are generally applied to the glass at a temperature at least as high as the temperature of the glass ribbon exiting the metal bath, i.e., at greater than 500° C. The short lock-chamber device according to the invention makes it possible to apply this metal oxide deposit without reheating the glass ribbon.

We claim:

1. An apparatus for extracting a glass ribbon from an exit of a flotation furnace sized to permit free passage of said glass ribbon from said furnace interior, which apparatus comprises:
   (a) a plurality of extraction rollers arranged in succession adjacent the end portion of the flotation furnace for extracting the glass ribbon from said exit, said rollers disposed such that they elevate to create a gap beneath said glass ribbon at said exit whereby gases which combust as they pass through said gap surround said glass ribbon and form a thermal barrier; and
   (b) enclosure means arranged adjacent the exit of the flotation furnace for enclosing said rollers, said enclosure means having an opening for receipt of the glass ribbon exiting the flotation furnace and having an opening for passage of the glass ribbon therefrom, said enclosure means also having an opening located above at least the first one of said rollers and adjacent the exit of the flotation furnace for venting said combustion gases to the ambient atomsphere.

2. An apparatus according to claim 1 wherein the enclosure means comprises a case.

3. The apparatus according to claim 2 wherein the case comprises a U-shaped cradle and an inverted U-shaped roof positioned above and supported by the cradle, said roof having an end nearer the furnace which is positioned downstream of said first of said rollers and wherein said opening for venting said combustion gases is defined by the space between the exit end of the said furnace and the end of said roof.

4. The apparatus according to claim 3 wherein the cradle has side walls positioned parallel to the glass ribbon flow with the extraction rollers rotatably mounted within the cradle between said side walls so as to position the rotational axes of the extraction rollers transverse to the direction of the glass ribbon flow, said side walls having upper edges which terminate at least at a level equal to the level of the upper generatrix of the extraction rollers.

5. The apparatus according to claim 4 wherein the U-shaped cradle further comprises at least one traverse wall connected to an end of the U-shaped cradle, the traverse wall being positioned so that its upper edge terminates approximately below the upper generatrix of the extraction rollers thus permitting the glass ribbon to pass thereabove.

6. The apparatus according to claim 3 further comprising means for sealing at least one of the end portions of the roof.

7. The apparatus according to claim 6 wherein said roof sealing means comprises at least one gas-tight curtain positioned at the end portion of the roof above the glass ribbon.

8. The apparatus of claim 7 wherein each gas-tight curtain of the roof sealing means extends to a position closely adjacent said glass ribbon.

9. The apparatus according to claim 3 wherein the cradle comprises a carriage having means for moving the carriage transverse to the flow of the glass ribbon.

10. The apparatus according to claim 3 wherein the end of the roof is located to a position between a first and second of said plurality of extraction rollers.

11. The apparatus according to claim 1 further comprising means for limiting the size of the exit above the glass ribbon for said free passage from said flotation furnace to thereby minimize the escape of the atmosphere within the flotation furnace above the glass ribbon.

12. The apparatus according to claim 11 wherein said flotation furnace limiting means comprises a plurality of gas-tight curtains positioned above the glass ribbon at the egress of the flotation furnace with the lower edge of at least one of the curtains terminating immediately above said glass ribbon.

13. The apparatus according to claim 12 further comprising means for regulating the temperature of the egress of the flotation furance.

14. The apparatus according to claim 13 wherein said temperature regulating means comprises a cooling grid secured to the flotation furnace within the region of the egrees below the glass ribbon.

15. The apparatus according to claim 14 further comprising a thermal screen positioned between the cooling grid and the extraction roller adjacent said flotation furnace so that said adjacent extraction roller is at least partially insulated from the cooling grid.

16. The apparatus according to claim 15 wherein the cooling grid comprises a plurality of pipes, each pipe independently supplied with a cooling fluid for cooling the egress of the flotation furnace below the glass ribbon.

17. The apparatus according to claim 1 wherein the extraction rollers further are disposed within said enclosure means whereby said combustion gases pass underneath at least the extraction roller adjacent said flotation furnace and said thermal barrier between said enclosure means and said flotation furnace is maintained.

18. Apparatus for use in combination with a flotation furnace for extracting continuously a ribbon of glass through an outlet and supporting the ribbon of glass in movement to a downstream processor wherein said apparatus comprises:
 (a) a plurality of extraction rollers arranged in succession adjacent to the outlet of the flotation furnace; and
 (b) enclosure means arranged closely adjacent the outlet of the flotation furnace and including
  (1) a lower portion having a pair of side walls with an upper supporting surface and means defining both an entrance to and an exit from the enclosure means,
  (2) an upper portion of an outline similar to the outline of the lower portion received on and supported by the supporting surface of the side walls, the upper portion being coextensive with the lower portion only throughout a part of its length thereby to provide a chimney of a size to include the area at least above the first of the extraction rollers of the plurality; and
 (c) the plurality of extraction rollers being disposed within the lower portion of the enclosure means and supported by the side walls so that the upper generatrix of the extraction rollers is above the level of the entrance to and exit from the enclosure means, at a level no higher than the level of the supporting surfaces to permit passage of the glass ribbon through said enclosure means and at a level to elevate said glass ribbon at said outlet to create a gap therebeneath whereby gases which combust as they pass through said gap surround said glass ribbon and form a thermal barrier, said combustion gases exiting said apparatus through said chimney.

19. The apparatus according to claim 16 wherein the pipes of the cooling grid are cooling pins.

UNITED STATES PATENT AND TRADEMARK OFFICE
CERTIFICATE OF CORRECTION

PATENT NO. : 4,141,713
DATED : February 27, 1979
INVENTOR(S) : Piero Ammannati and Jean-Claude Coulon It is certified that error appears in the above-identified patent and that said Letters Patent are hereby corrected as shown below:

Under "[56] References Cited U. S. Patent Documents", the following references do not appear:

| | | | |
|---|---|---|---|
| 3,674,456 | 7/72 | Swillinger | 65/182 R |
| 3,684,475 | 8/72 | Bondarev et al. | 65/182 R |
| 3,754,880 | 8/73 | Henderson et al. | 65/27 |

Please add the following references under "Foreign Patent Documents":

| | | | |
|---|---|---|---|
| 1,107,142 | 3/68 | Dickinson et al. | Great Britain |
| 1,141,822 | 2/69 | Javaux | Great Britain |

Claim 14, column 7, line 26, before "below", "egrees" should be -- egress --.

Signed and Sealed this

Twenty-ninth Day of May 1979

[SEAL]

Attest:

RUTH C. MASON
Attesting Officer

DONALD W. BANNER
Commissioner of Patents and Trademarks